United States Patent [19]

Inaba et al.

[11] Patent Number: 4,870,556
[45] Date of Patent: Sep. 26, 1989

[54] METHOD AND APPARATUS FOR CONTROLLING POWER CONVERTER

[75] Inventors: Hiromi Inaba; Seiya Shima; Toshiaki Kurosawa, all of Katsuta; Toshimitsu Tobita, Hitachi; Mitsuyuki Hombu; Nobuo Mitsui, both of Katsuta, all of Japan

[73] Assignee: Hitachi, Ltd., Tokyo, Japan

[21] Appl. No.: 2,283

[22] Filed: Jan. 12, 1987

[30] Foreign Application Priority Data

Jan. 11, 1986 [JP] Japan ................................. 61-2875

[51] Int. Cl.⁴ ............................................. H02M 1/12
[52] U.S. Cl. ......................................... 363/41; 363/37
[58] Field of Search ..................... 363/35, 37, 41, 51

[56] References Cited

U.S. PATENT DOCUMENTS

| 3,905,023 | 9/1975 | Perpiglia | 364/200 |
| 4,290,108 | 9/1981 | Woehrle et al. | 363/41 X |
| 4,331,994 | 5/1982 | Wirth | 363/37 X |
| 4,475,150 | 10/1984 | D'Atre et al. | 363/51 |
| 4,488,103 | 12/1984 | Morinaga et al. | 318/811 |
| 4,553,197 | 11/1985 | Stemmler | 363/41 X |
| 4,666,020 | 5/1987 | Watanabe | 363/37 X |
| 4,672,520 | 6/1987 | Ueda et al. | 363/37 |

FOREIGN PATENT DOCUMENTS

| 57-25171 | 2/1982 | Japan . | |
| 0665379 | 5/1979 | U.S.S.R. | 363/37 |

OTHER PUBLICATIONS

Intel Corporation, "Using the 8096", Feb. 1985, pp. 26-27.
Takeshita & Matsui, "One-Chip Microcomputer-Based Flux-Controlled Real Time PWM", *The Journal of the Institute of Electrical Engineers of Japan*, vol. 105, No. 6, pp. 531-538.

Primary Examiner—Patrick R. Salce
Assistant Examiner—K. Peckman
Attorney, Agent, or Firm—Antonelli, Terry & Wands

[57] ABSTRACT

Control signals for operating power converter switching elements are created using one-chip microcomputers. Pulse patterns required to supply the control signals and their generating timings are previously created and scheduled in pairs. When the times when the control signals are to be supplied to the switching elements have actually come, those control signals are successively output.

26 Claims, 17 Drawing Sheets

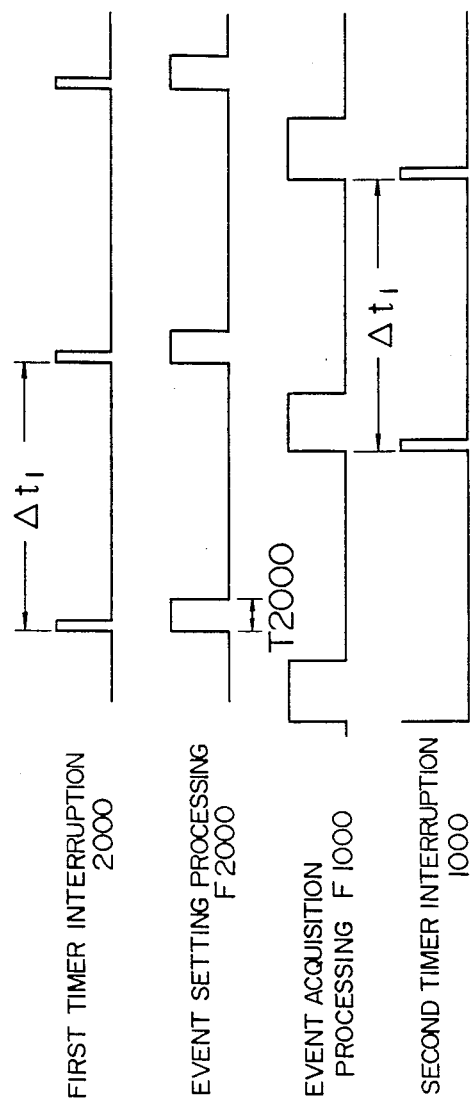

FIG. 6

| AREA OF $\theta_T$ / SEQUENCE OF TURN-ON | | ALWAYS TURNED-ON DURING $\Delta t_1$ | TURNED-ON TILL EVENT GENERATION | TURNED-ON AFTER EVENT GENERATION |
|---|---|---|---|---|
| MODE 1 | 0° ~ 60° | 55 | 53 | 51 |
| MODE 2 | 60° ~ 120° | 51 | 55 | 56 |
| MODE 3 | 120° ~ 180° | 56 | 51 | 52 |
| MODE 4 | 180° ~ 240° | 52 | 56 | 54 |
| MODE 5 | 240° ~ 300° | 54 | 52 | 53 |
| MODE 6 | 300° ~ 360° | 53 | 54 | 55 |

FIG. 7

| $\theta_T$ | TIME ELAPSED TILL EVENT GENERATION $t_E = \dfrac{\Delta t_1 \cdot \sin(60° - \theta_T)}{\sin(60° - \theta_T) + \sin \theta_T}$ |
|---|---|
| 1 | $t_{E1}$ |
| 2 | $t_{E2}$ |
| ⋮ | ⋮ |
| n | $t_{En}$ |
| ⋮ | ⋮ |
| 60 | $t_{E60}$ |

FIG. 11
(a) 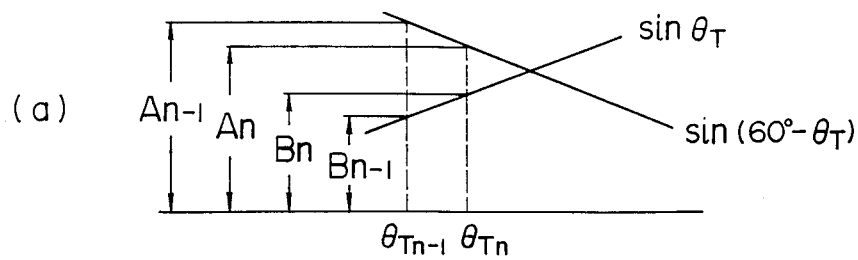
(b) 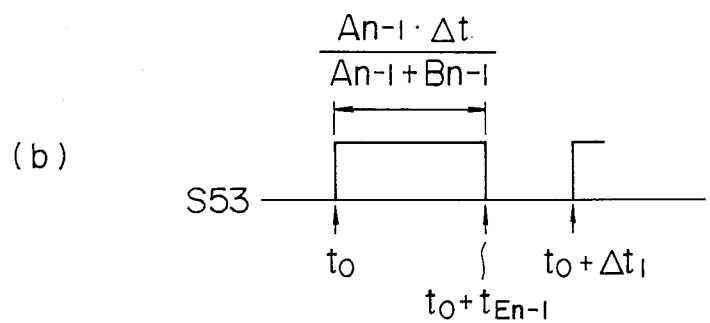
(c) 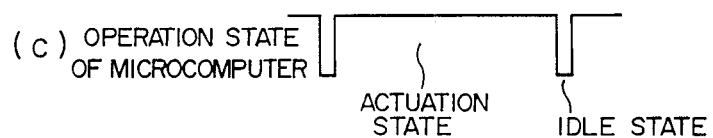

METHOD AND APPARATUS FOR CONTROLLING POWER CONVERTER

BACKGROUND OF THE INVENTION

This invention relates to a power converter such as an inverter and more particularly to a method and apparatus for controlling a power converter which is preferably used for a winding machine for an elevator.

Inverters have been widely used for controlling elevators using induction motors for driving winding machines. Power converters including such inverters have been mainly controlled by analog control systems. Such analog control systems, however, provide several problems including their output fluctuation and limited setting accuracy; the output fluctuation will be caused by the secular changes of several components used in the systems.

In order to solve these problems, several digital control systems have been proposed.

One example thereof is disclosed in JP-A-57-25171. In the system disclosed therein, pulse width data is previously stored, during the absence of the processing by a microcomputer, in a timer externally attached in the bus of the microcomputer, and the microcomputer, when interrupted by the timer, only supplies an actuation instruction to the timer, thereafter performing a scheduled processing, so that the microcomputer doesn't need to perform the output processing. This system permits the microcomputer to concentrate on the processings of the reference to a data table for acquisition of the pulse width data and the data working so that the performance thereof may be improved.

Another example is disclosed in an article entitled "Magnetic Flux Type Realtime Processing PWM (Pulse Width Modulation) Control by One-chip Microcomputer" in the Proceedings of the Institute of Electrical Engineers of Japan, Vol. 105, No. 6, pp 531-538, (June 1985), 60-B61. This example is a system of performing a PWM control in a direct connection of an input/output port incorporated in a one-chip microcomputer and a pulse amplifier. This system provides the advantages that the circuit construction is simplified since the timer can be incorporated in the one-chip microcomputer and the distribution circuit can be implemented in software, and the abnormality of the port can be covered in some degree by the self-diagnosis function of the microcomputer.

However, the former system involves the following problems since a timer, distribution circuit, etc. must be externally provided.

① In the system arrangement, required are the timer circuit and the circuit for distributing three-system timer outputs to six switching elements of a power converter of a three-phase A.C. system, and these circuits externally attached may increase the production cost of the system and the possibility of the malfunction thereof due to noise mixing.

② Since the timer and distribution circuits are provided externally from the microcomputer, the self-diagnosis function of the microcomputer, e.g., watch dog timer doesn't permit their abnormality to be detected. Therefore, another abnormality detection circuit is required for the circuits externally provided.

On the other hand, the latter system involves the problem that because of the increased amount of processing in the microcomputer, the minimum pulse width of the control signals to be supplied to the switching elements of the power converter cannot be reduced less than the interruption processing time in the microcomputer.

SUMMARY OF THE INVENTION

An object of this invention is to provide a method and apparatus for controlling a power converter which is capable of solving the aforesaid problems of the prior art and generating pulse outputs with their pulse width being sufficiently narrow, in a simplified circuit construction using a microcomputer.

To attain this object, in accordance with this invention, pulse patterns for creating control signals to be supplied to the switching elements of a power converter are previously and successively created, a schedule processing of successively setting, as pairs, the pulse patterns and times when they are to be supplied is executed and the control signals are successively output at the times when they are to be actually supplied to the switching elements. Thus, the control signals can be previously created prior to the times when they are actually required, regardless of the times, so that the microcomputer bears a light burden and pulse outputs with their minimum pulse width being sufficiently narrow can be generated in a simplified system arrangement.

The above and other objects and feature of this invention will become more readily apparent from the following description of the accompanying drawings.

BRIEF DESCRIPTION OF THE DRAWINGS

FIG. 4 is a view for explaining actuation timings;

FIG. 6 is a view for explaining the modes;

FIG. 7 is a view for explaining a time set processing;

FIG. 11 is a view for explaining one example of the event set processing;

DESCRIPTION OF THE PREFERRED EMBODIMENTS

Figure 1:
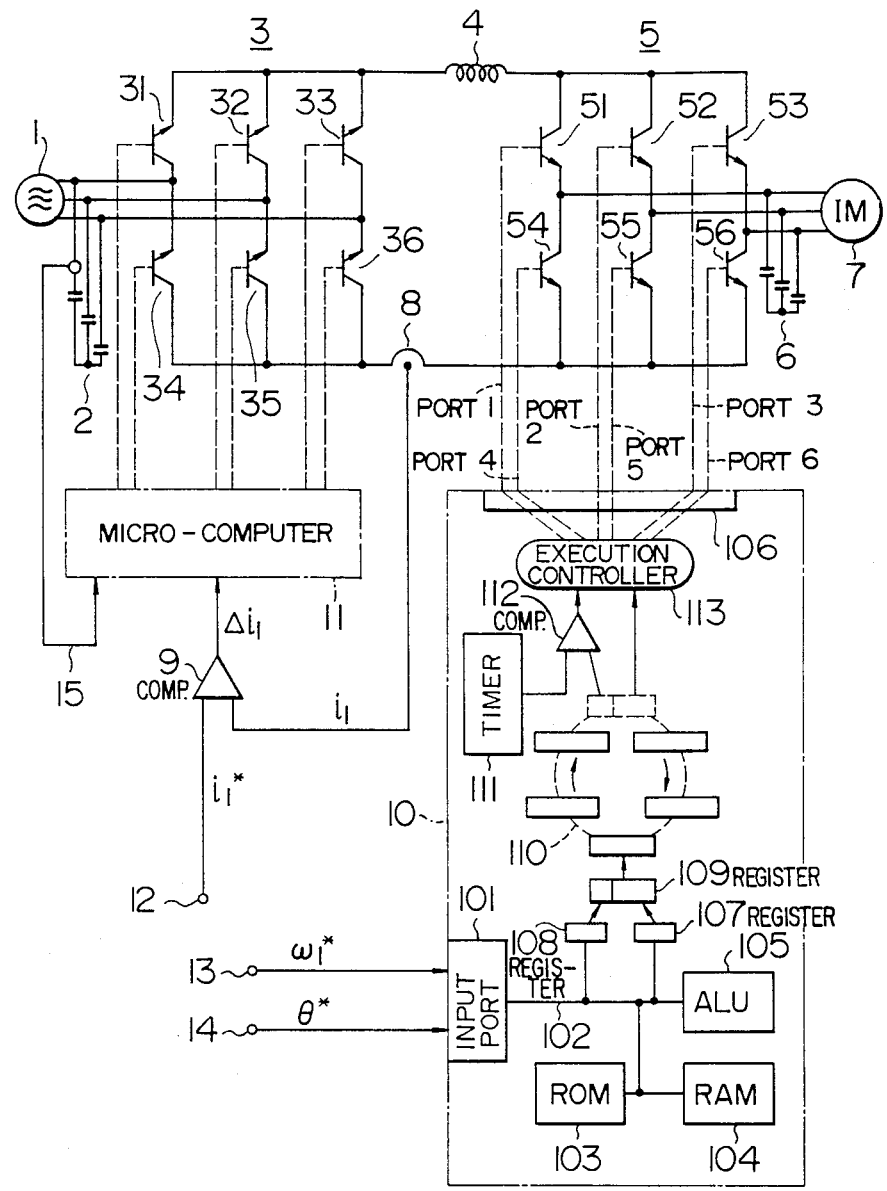
FIG. 1 is a view showing a whole arrangement of one embodiment of this invention.

Now referring to the drawings, detailed explanation will be given for a power converter controlling apparatus according to this invention using the embodiment as shown in the drawings.

FIG. 1 shows a whole arrangement of one embodiment of this invention. In the figure, 1 is a three-phase A.C. power supply; 2 is a capacitor for excess voltage suppression; 3 is a current converter section for performing A.C.-D.C. conversion; 31 to 36 are transistors which constitute the main switching elements of the converter section 3; 4 is a D.C. reactor; 5 is a current converter section for performing D.C.-A.C. conversion; 51 to 56 are transistors which constitute the main switching elements of the converter section 5; 6 is a capacitor for excess voltage suppression; 7 is an induction motor shown as one example of a load; 8 is a D.C. current detector; 9 is a comparator for comparing a primary current instruction $i_1^*$ with a feedback value $i_1$; and 10 and 11 are one-chip microcomputers for supplying pulse patterns (control signals) to the transistors 31 to 36 and 51 to 56. Incidentally, since the one-chip microcomputers 10 and 11 have the same hardware construction, their detailed explanation will be mainly given for the microcomputer 10. Also in this embodiment, transistors are used as the main switching elements but the other elements having a switching function, e.g. GTO (Gate Turn-Off Thyristor) may also be used.

Further, in FIG. 1, 12 is a terminal to which a primary current instruction $i_1^*$ to be applied to a converter control system is supplied; 13 and 14 are terminals to which a frequency instruction $\omega_1^*$ and a phase instruction $\theta^*$, which are to be supplied to an inverter control system, are supplied, respectively; and 15 is a signal line for inputting signals for power supply synchronization.

The one-chip microcomputer 10 is constructed by an input port 101, an internal bus 102, a ROM (read-only memory) 103 for storing programs, a pulse width data table, etc., a RAM (random access memory) 104 which is used as a temporary memory or register, an ALU (arithmetic logic unit) 105 for performing arithmetic, etc., an event setting register 107 for setting an event necessary for outputting control signals consisting of predetermined pulse patterns to an output port, a timing setting register 108 for setting the timings when the event is to be enabled, a holding register 109 for concatenating the contents of both registers 107 and 108 and holding them, an associative memory 110 for successively and cyclically storing some sets of data set in the holding register 109, a timer 111 for outputting actual timings, a comparator section 112 for comparing the timings given by the timer 111 with the timings set in the associative memory 110 and generating outputs when they coincide with each other, an execution controller 113 for output-controlling, in response to the trigger received from the comparator section 112, the set event to the output port 106.

Now, the operation of this embodiment will be explained. Here, the case of inverter control for D.C.-A.C. inverter 5 will be explained.

Figure 2:
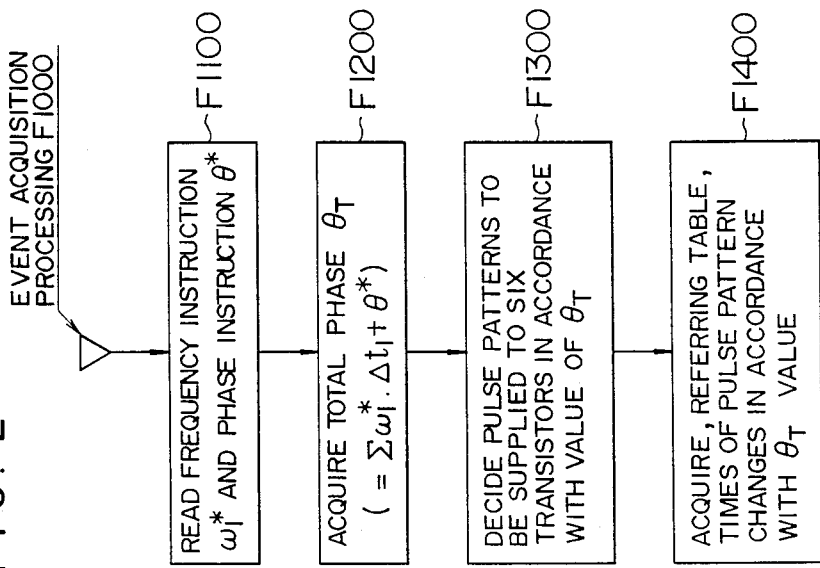
FIG. 2 is a flowchart of an event acquisition processing.
Figure 5:
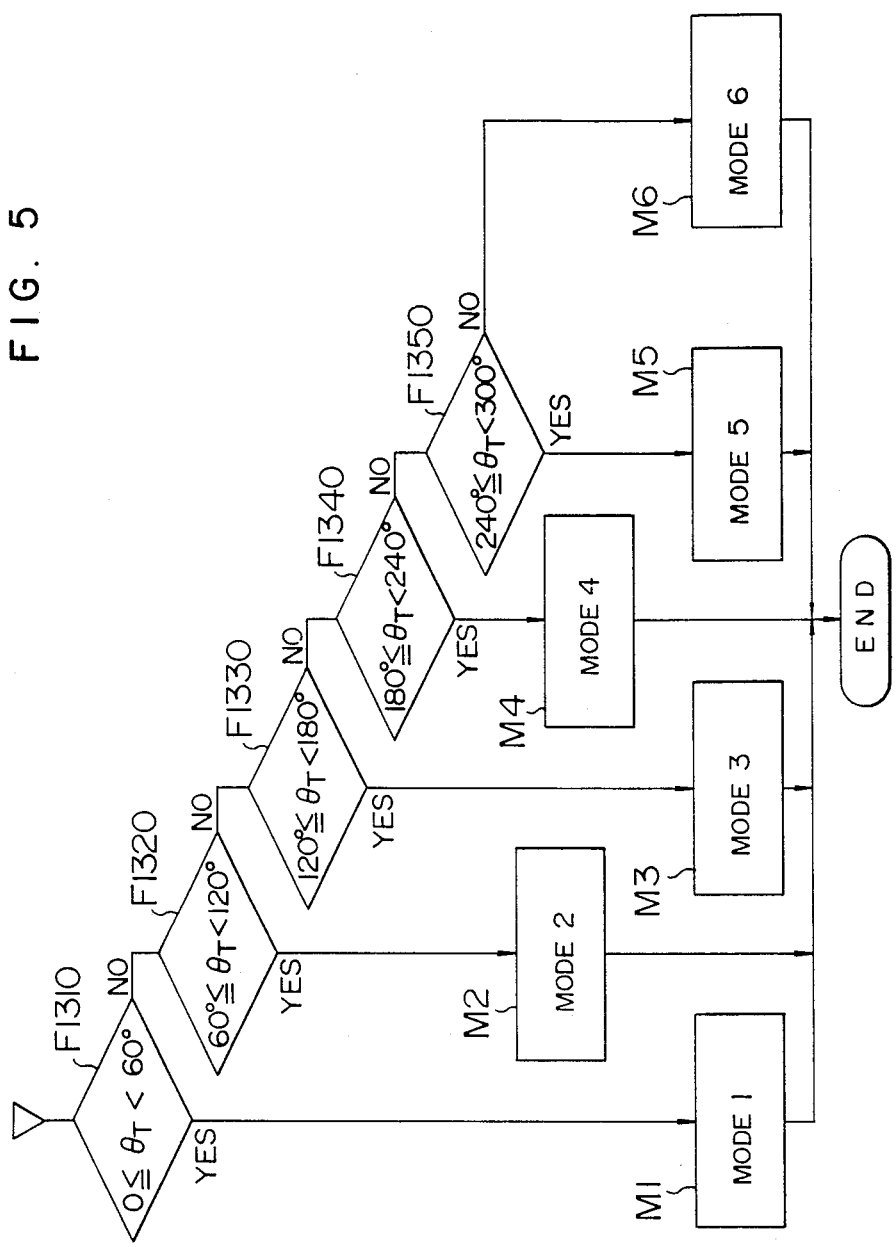
FIG. 5 is a flowchart of a mode selection processing.

FIG. 2 is a schematic flowchart of an event acquisition processing program F1000 for acquiring an event or pulse pattern to be generated to the output port 106. First, a frequency instruction $\omega_1^*$ and a phase instruction $\theta^*$, which are sent from an external instruction device, are read from the input port 101 (F1100); if $\omega_1^*$ and $\theta^*$ are calculated within the one-chip microcomputer 10, this port reading is not required. The frequency instruction $\omega_1^*$ is integrated for each fixed time (interruption interval) $\Delta t_1$ and added to the phase instruction $\theta^*$ so as to obtain a total phase $\theta_T$ (F1200). There are six modes of pulse pattern provided by dividing an electrical angle of 360° into six angle ranges, each of which is 60°. One of the six modes to be outputted is selected in accordance with the total phase $\theta Y$ now acquired, that is, the output event decided in accordance with the total phase $\theta Y$ is acquired (F1300). The relation between the total phase $\theta_T$ and the six modes will be described in detail later (FIG. 5). Finally, the time $t_{EN}$ elapsed until when the pulse pattern is changed during the interruption interval $\Delta t_1$ is acquired with reference to a data table using the total phase $\theta_T$ (F1400).

Thus, two items, i.e. the event contents and event change timings which are set in the event setting register 107 and the timing setting register 108 are decided.

Figure 3:
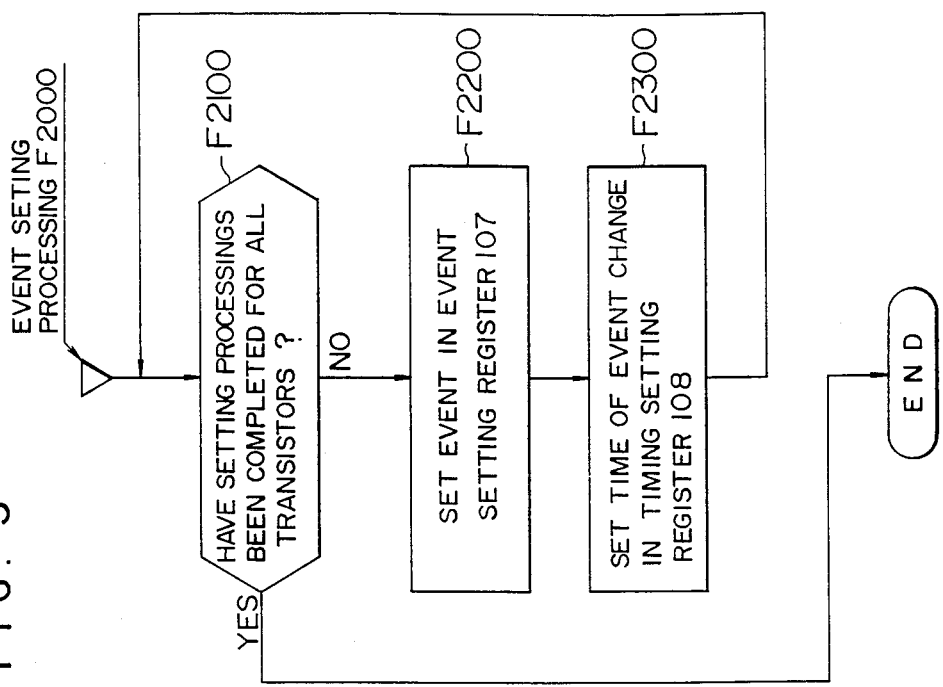
FIG. 3 is a flowchart of an event set processing.

The two items thus obtained are set in the associative memory 110 provided for an output port control in the flowchart as shown in FIG. 3. More specifically, first, a checking is made on if the event and timing have been set for all six transistors (F2100). If the answer is NO, the associated event is set (F2200) and thereafter the associated event change timing is set (F2300). Thus, the processing of F2000 is ended.

The two processings of F1000 and F2000 mentioned above will be actuated at the timings as shown in FIG. 4. The event setting processing F2000 is actuated in synchronism with first timer interruptions occurred for each $\Delta t_1$. On the other hand, the event acquisition processing F1000 is actuated in synchronism with second timer interruptions, which also occur for each $\Delta t_1$, prior to the first timer interruptions. And the event acquisition processing is completed immediately before the actuation of F2000. This intends to permit the newest data to be used in F2000. Of course, if the redundant time element corresponding to the timer interruption interval may be included, F2000 can be followed by F1000. In this case, the time required for the checking of an interruption is reduced so that the interruption interval $\Delta t_1$ can be set to a short time, thereby permitting a high frequency converter to be realized.

Accordingly, in accordance with this embodiment, after predetermined events and timings have been set, the associative memory 110 undertakes the output port control so that the main processor section (ALU 105) is released from the output processing.

Referring to FIG. 5, the decision of pulse patterns in the procession of F1300 will be explained.

In the case of the inverter control in accordance with this embodiment, the pulse pattern is changed for each electric angle of 60° six modes making a tour of 360° are repeated. Therefore, the six modes M1 to M6 each having an interval of 60° are adapted to be selected for the total phase $\theta_T$. The flowchart for this selection is shown in FIG. 5. If the total phase $\theta_T$ goes out from the range of 0° to 360°, an area checking is made at the top of F1300 shown in FIG. 2; this area checking adds/subtracts 360° to/from the total phase $\theta_T$ to bring back it in the above range.

FIG. 6 shows, for each of the modes M1 to M6, a combination of a transistor which is being always turned on during the interval $\Delta t_1$, a transistor which is being turned on until the generation of the event and thereafter, being turned off, and a transistor which is being turned off until the generation of the event and thereafter being turned on. From the figure, therefore, if the phase $\theta_T$ is provided, the associated mode is also provided so that the transistors to be turned on or off can be specified. The matter which is not clear at this time when the processing of F1300 has been completed is only the timings of turn-on or off.

Incidentally, the turn-on/off of the transistors means that their outputs are specified, for example, in such a manner that when the event is set, the turn-on thereof sets a register to "1" while the turn-off thereof set the register to "0".

Referring to FIG. 7, the processing of providing the timings when the event is to be changed (F1400 of FIG. 2) will be explained.

Since the inverter in this embodiment only desires to provide a waveform analogous to a sine wave output, adopted is a system in which the interruption interval is distributed to the ratio of sin $\theta_T$ to sin $(60° - \theta_T)$ phase-displaced by 120° therefrom in accordance with the phase $\theta_T$. Namely, the times $t_E$ elapsed until when the event is generated (or the pulse pattern is changed), which are calculated as a function of the phase $\theta_T$ from the following equation, are previously tabulated, and seached using the phase $\theta_T$.

$$t_E = \frac{\Delta t_1 \cdot \sin(60° - \theta_T)}{\sin(60° - \theta_T) + \sin \theta_T}$$

Incidentally, this embodiment, which relates to a current source inverter, has a merit that the working of the data table is not required since that inverter has only to act as a switch for converting an original waveform into a sine wave. In the case where this invention is applied to a voltage source inverter, after the searching of the table, the working of the data must be performed considering the amplitude, pulse width, etc.

Figure 8:
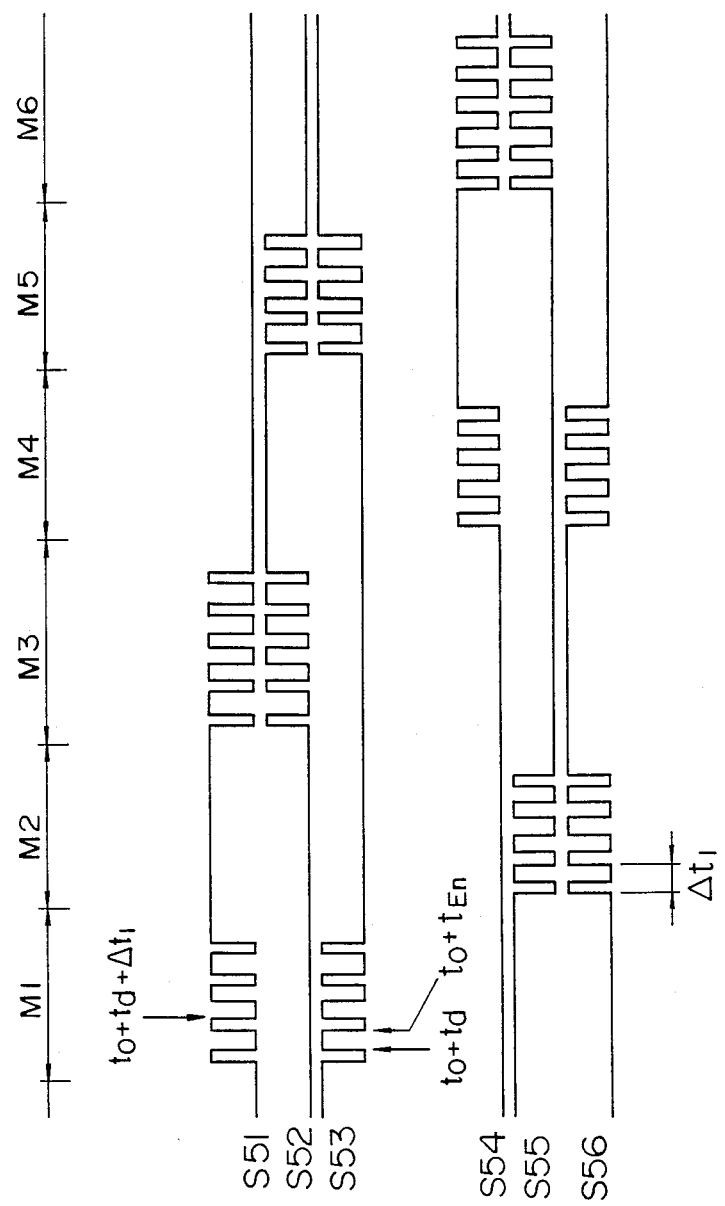
FIG. 8 is a timing chart of one example of a signal waveform.

FIG. 8 shows one example of the port output signals S51 to S56 supplied to the transistors 51 to 56 in accordance with the operation mode.

As seen from the figure, the operation modes M1 to M6 have different electric angles. This is because the timer interruption interval $\Delta t_1$ asynchronous with the frequency instruction $\omega_1^*$, and so can be obviated by controlling $\Delta t_1$ so that it varies in accordance with $\omega_1^*$.

Figure 9:
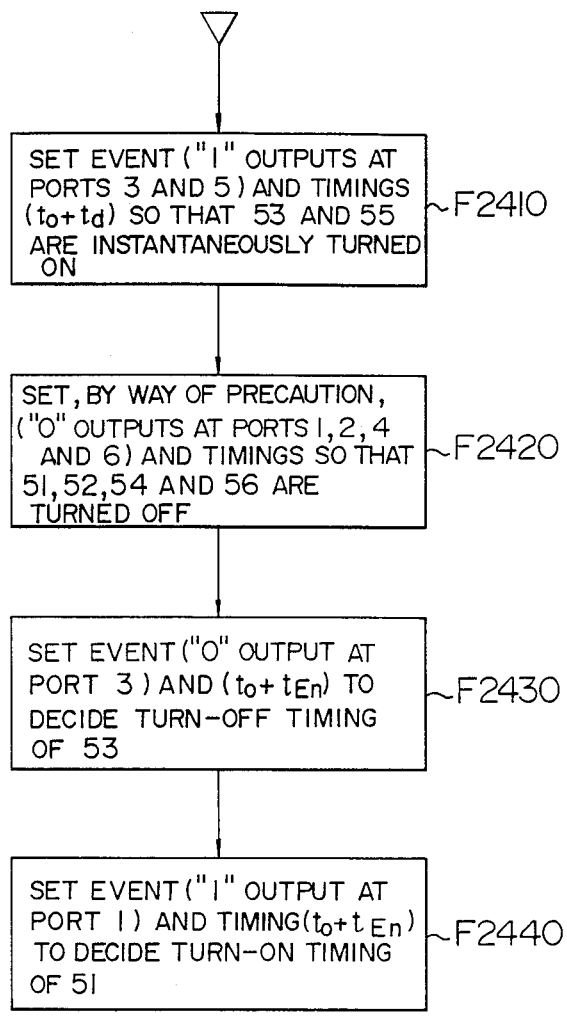
FIG. 9 is a flowchart of an event set processing.

Referring to FIG. 9, the event setting processing will be explained. FIG. 9 is a flowchart in which the starting portion at the mode $M_1$ in FIG. 8 is embodied. Although in FIG. 3, the event setting processing has been explained in a loop arrangement for its general explanation, it actually flows in series as shown in FIG. 9.

The flowchart of FIG. 9 shows the event setting processing during the timer interruption interval from a time $t_o+t_d$ to a time $t_o+t_d+\Delta t_1$ in FIG. 8. First, when an interruption occurs at the time $t_o$, two sets of event setting and timing setting are made for the transistor 55 and 53 so that a turn-on signal is immediately supplied to them (F2410); as shown in FIG. 6 the transistor 55 is always turned on during the mode M1 and the transistor 53 is turned on only until when the event is generated. More specifically, the event setting is performed so that a "1" signal is generated at the ports 5 and 3 corresponding to the transistors 55 and 53 and the timing setting is made by setting the present time $t_o$ plus a prescribed time $t_d$ in a predetermined register. Then, since those transistors are to be immediately turned on, the prescribed time $t_d$ must be set to an allowable minimum value. In this way, the events and timings are set in the associative memory 110, and thereafter when $t_d$ elapses, the "1" signal will be output to the transistors 55 and 53 along the prescribed schedule.

The reason why the prescribed time $t_d$ is added to the time $t_o$ is as follows. Some time necessarily elapses until when the event is read out after it has been set in the associative memory 110. Therefore, if the present time $t_o$ is set without adding the time $t_d$, the coincidence in the comparator 112 cannot be obtained so that the event cannot be supplied to the output port 106.

Now returning back to the flowchart of FIG. 9, in the processing of F2420, the processing of recognizing the turn-off of the transistors to be in a turn-off state during the mode M1 is carried out on the assumption that the operation mode has been changed because of the abrupt change of the phase instruction $\theta^*$, etc. This processing is also performed by the associative memory 110 like F2410. Since the event to be set is "turn-off", the event setting is made so that a "0" signal is generated at the port 1, 2, 4 and 6.

Next, a scheduled processing of F2430 is performed so that the transistor 53 is turned off at the timing of $t_o+t_{EN}$. The event to be set is an "0" output at the port 3 and the timing to be set is $t_o+t_{EN}$.

In the processing of F2440, the scheduled setting is performed so that the transistor 51 is turned on in place of the turn-off of the transistor 53. Although in this embodiment, the turn-off of the transistor 53 and the turn-on of the transistor 51 have been scheduled at the same timing $(t_o+t_{EN})$, it is also possible to use different times of $t_{EN}$ in F2430 and F2440 for the protection of excess voltage in such a manner that in the current source inverter the "1" periods overlap each other while in the voltage source inverter, a non-overlap period is created.

After the processings of F2410 to F2440 have been performed, the associative memory 110 performs the timing comparison and output control for each predetermined time so that the main processor section (ALU 105) is released from the output processing.

Figure 10:
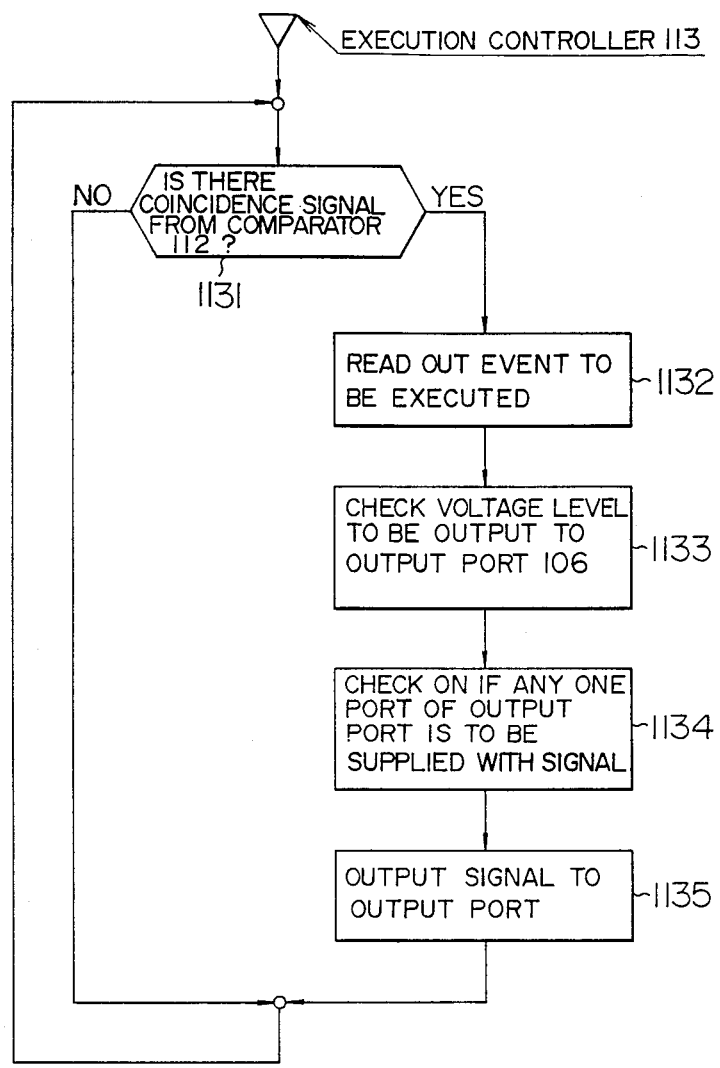
FIG. 10 is a flowchart of the operation of an execution controller.

The operation of the execution controller 113 will be explained with reference to the flowchart of FIG. 10.

First, in a processing 1131, checking is made on if a coincidence output has been provided by the comparator 112. This checking is made by the existence of the signal generated by the comparator 112 when the value (real time) of the timer 111 coincides with the contents (set timing), written in the timing setting register, of the scheduled contents. If the coincidence output is not present, any processing doesn't follow but the operation of the execution controller 113 is returned to its beginning. On the other hand, if the coincidence output is present, the event to be executed is read out in a processing 1132. Namely, when the time elapses to reach the scheduled timing, the event making a pair with the timing is read out. In a processing 1133, the voltage level to be sent to the output port 106. In this embodiment, the output levels corresponding to the turn-on/off of the transistors 51 to 56 are checked. In a processing 1134, checking is made on if any one of the transistors 51 to 56 that is, any one port of the output port 106 is to be supplied with the voltage. Finally, in a processing 1135, the scheduled signal is actually output to the associated port of the output port 106.

In this way, the execution controller serves to control the execution of the event in such a way that when the scheduled time has come, the associated signal is received and the event making a pair therewith is implemented.

Figure 12:
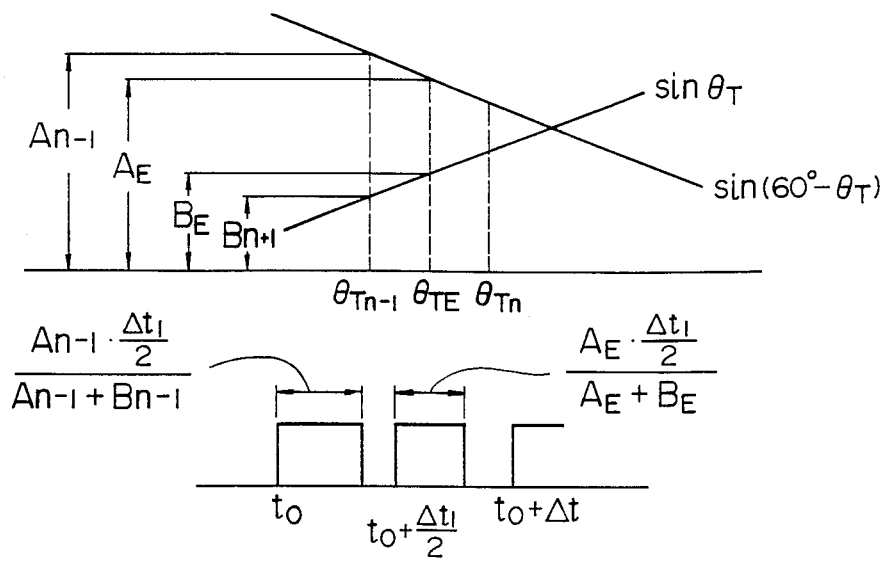
FIG. 12 is a view for explaining another example of the event set processing.

Now referring to FIGS. 11 and 12, detailed explanation will b given for the setting of plural events at the same port within the same timer interruption.

FIG. 11 (a) and FIG. 11 (b) show two sine waves, sine $\theta_T$ and sine $(60° - \theta_T)$ and a pulse pattern S53 to be supplied to the transistor 53 during the period of $t_o \sim t_o + \Delta t_1$. In the case of this pulse pattern, as seen from FIG. 11 (b), two settings of a turn-on setting at $t_o$ and a turn-off setting at $t_o + t_{EN-1}$ are made for the port 3 during the timer interruption interval $\Delta t_1$. On the other hand, in the case shown in FIG. 12, four turn-on/off settings are made during $\Delta t_1$. More specifically, the timer interruption interval $\Delta t_1$ is divided into two half sections, and during the former half section, $\Delta t_{\frac{1}{2}}$ is distributed with a ratio between the sine wave peak values of $\theta_{T_{n-1}}$ at the timing to while during the latter half section the remaining $\Delta t_{\frac{1}{2}}$ distributed with a ratio between the sine wave peak values of an estimation value $\theta_{TE}$ of $\theta_T$ at the timing $t_o + \Delta t_{\frac{1}{2}}$, which is obtained from $\theta_{n-1}$ and $\theta_{n-2}$. This provides the following effect. As understood from the operation state of the microcomputer shown in FIG. 11(c), if the pulse generation interval is reduced, the load ratio of the microcomputer (ratio of the actuation state to the idling state) is increased, so that the timer interruption interval $\Delta t_1$ is necessarily limited because of the processing time indispensable to a pulse with arithmetic, etc. This is a serious problem to implement a high frequency power converter using a microcomputer. On the other hand, in this embodiment, plural event setting can be made for the same port during the timer interruption interval $\Delta t_1$, thereby allowing the high frequency power converter to be realized.

Now, explanation will be given for another case of this embodiment when applied for controlling the converter section 3 for performing A.C.-D.C. conversion. The converter control is performed by the microcomputer 11. The converter control is more complicated than the inverter control since the following two operations must be simultaneously performed.

① In the case of the inverter control, synchronization is not entirely required, while in the converter control, the synchronization with a power supply frequency must be taken.

② In the case of the inverter control, a switching operation having a conduction rate (or current flow rate) of 1 has only to be performed while in the case of the converter a pulse width-control must be performed considering the conduction ratio of 0 to 1.

First, for the synchronization of ① the phase control, which has been in the conventional thyristor control, is adopted. In this phase control, the event to be supplied to the associative memory is a software timer interruption event in which the microcomputer itself is interrupted (in the case of inverter control, that event was a pulse turn-on/off instructions, 0* and 1*), and the timing to set is a time corresponding to a phase data. Further, when the phase schedule operation has been completed, a series of schedule relative to pulse switching must be initiated.

On the other hand, with respect to ②, considerations must be taken that the table of the time elapsed until when an event is generated, as shown in FIG. 7 is individually provided for several conduction ratios, and if the time elapsed until when the event is generated is comparatively long (i.e. when several processings are performed in a sufficient time), a scheduled processing of setting the succeeding several events and timings is performed.

Main processings in the converter control will be explained with reference to several flowcharts and timing charts.

Figure 13:
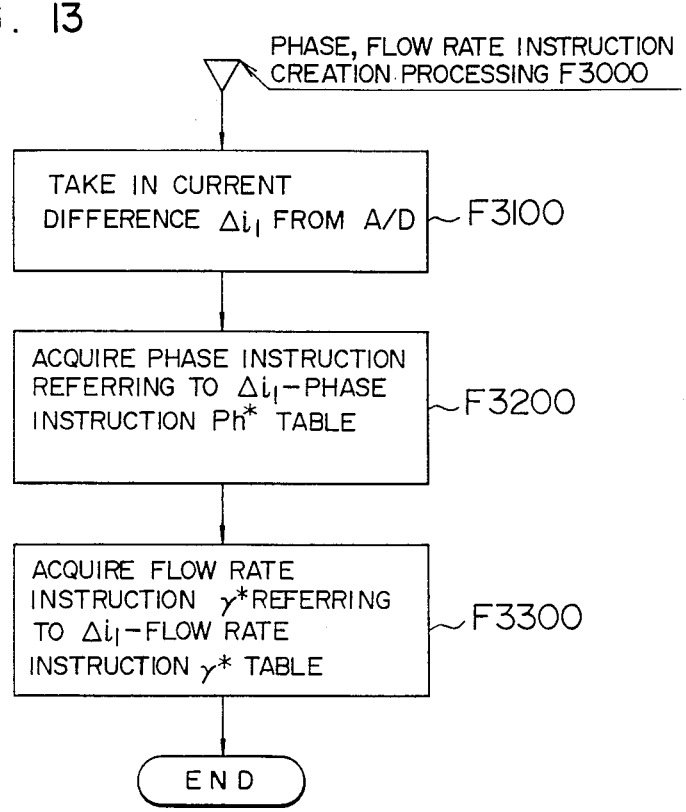
FIG. 13 is flowchart of a phase, conduction-ratio instruction creation processing.
Figure 14:
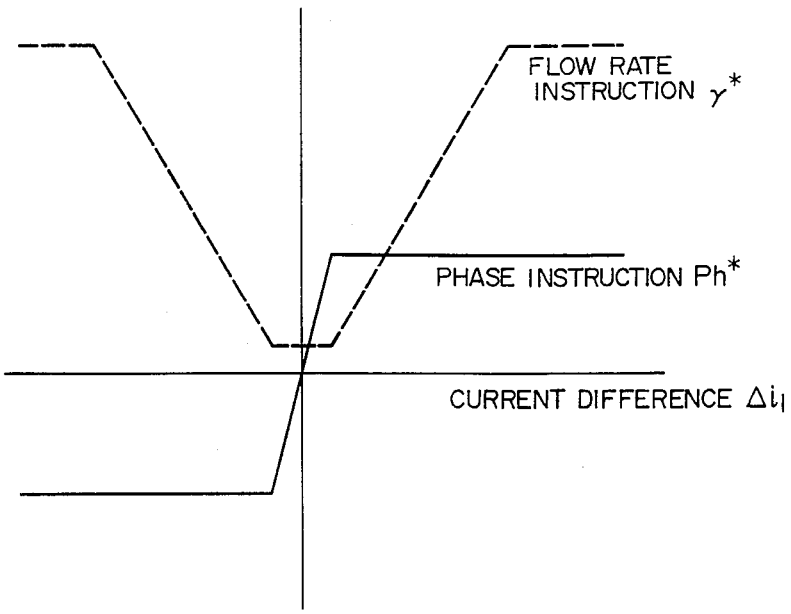
FIG. 14 is a view for explaining a phase, conduction ratio characteristic.

FIG. 13 shows a flowchart of a phase, conduction ratio instruction creation processing F3000. First, a current difference $\Delta i_i$ is taken in the microcomputer 11 from the comparator 9 (FIG. 1) through an A/D (analog-to-digital) converter (not shown) (F3100). A phase instruction Ph* and conduction ratio instruction $\gamma^*$ for this current difference, with their characteristics as shown in FIG. 14, are aquired (F3200 and F3300). These instructions Ph* and $\gamma^*$ may created in an external analog circuit and taken in the microcomputer 11 after the A/D conversion.

Figure 15:
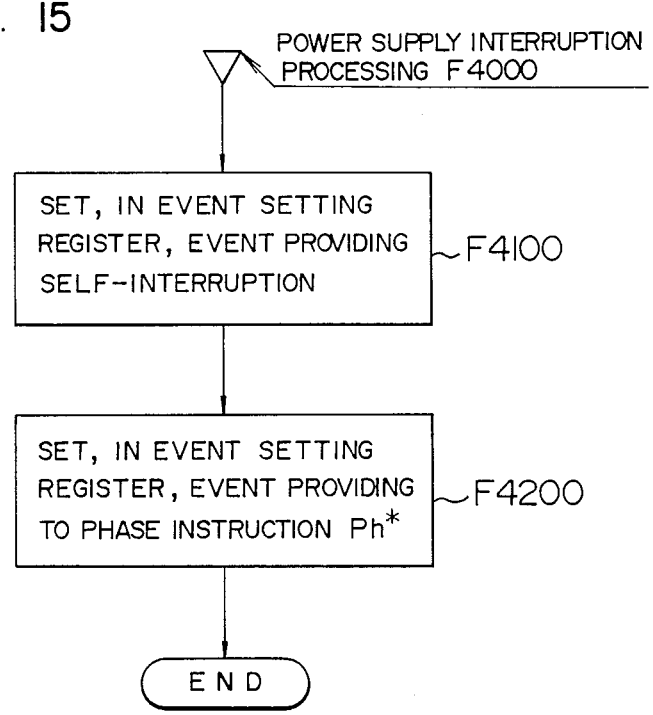
FIG. 15 is a flowchart of a power supply interruption processing.

FIG. 15 is a flowchart of a power supply interruption processing F4000. It should be noted that if the microcomputer 11 is externally interrupted, for example, by detecting a rising zero-crossing point of the U-phase of a three-phase power supply through the signal line 15 (FIG. 15), this interruption is generated for each electric angle of 360°. When this interruption occurs, in a processing F4100, the event which generates a variable software-interruption in the microcomputer itself is set. In processing F4200, the time corresponding to the phase instruction Ph* acquired in F3200 is set as a timing when the event is to be generated.

In the case of the inverter control mentioned above, the pulse switching processing was actuated by the timer interruption occurring for each substantially constant time, while in the case of the converter control, it will be actuated after the power interruption processing and the succeeding phase time.

Figure 16:
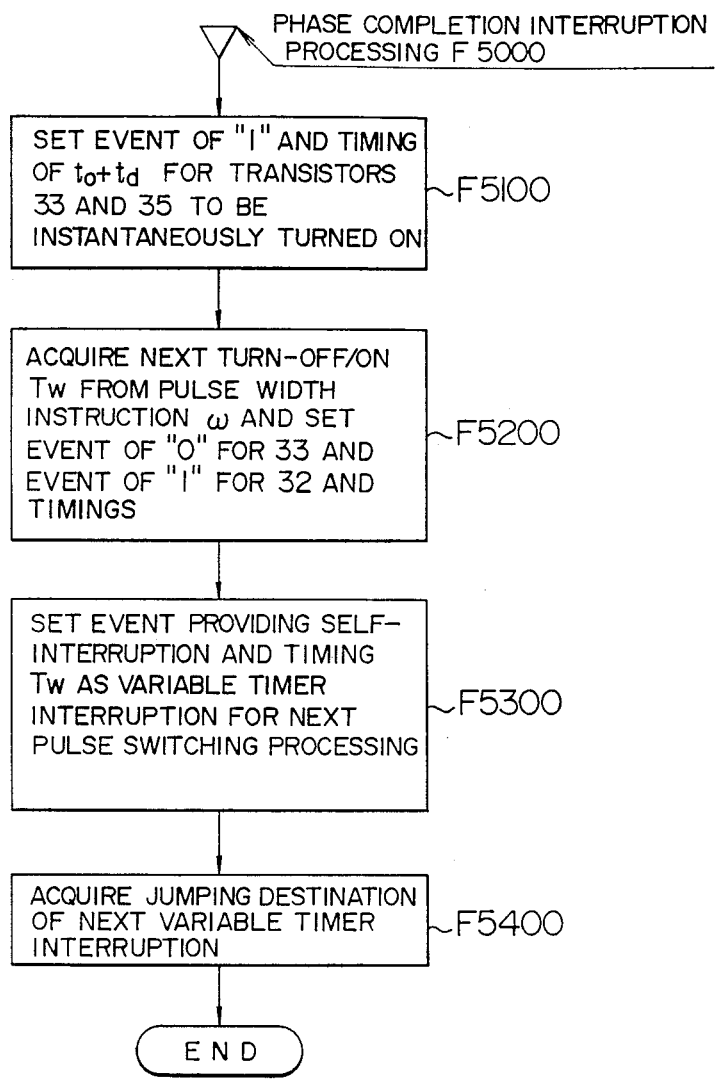
FIG. 16 is a flowchart of a phase completion interruption processing.

FIG. 16 shows a flowchart of a phase completion interruption processing of F5000. This processing is actuated when the phase time set in the power interruption processing of F4000 has come. First, in F5100, the event of "1" and the timing of the present time $t_o$ plus a short dummy time $t_d$ are set in the associative memory for the transistors 33 and 35 to be instantaneously turned on. In F5200, the events of "0" and "1" are set for the transistors 33 and 35 to be subsequently turned off and on; and the timing $T_W$, which is acquired by referring to the table of conduction rate instructions $\gamma^*$ and pulse width data, is also set for them. In F5300, an event of self-interruption is set at the above pulse switching timing $T_W$ for the preparation of the subsequent pulse switching. Finally, in F5400 the jumping destination, on a program, of the subsequent switching processing is previously acquired.

Figure 17:
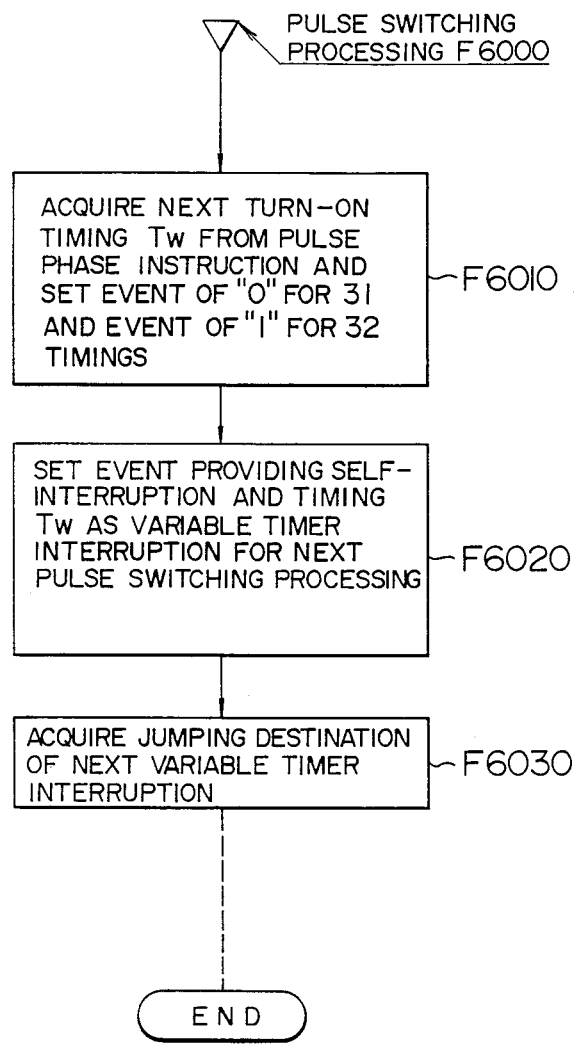
FIG. 17 is a flowchart of a pulse switching processing.

FIG. 17 shows the beginning portion of a pulse switching processing F6000. This beginning portion follows the phase completion interruption processing F5000. First, in F6010, the events of "0" and "1" are set for the transistors 31 and 32, respectively and the timing $T_W$ is also set for them. In F6020, the event which generates the variable software interruption in the microcomputer itself at the timing $T_W$ set in F6010 and its timing $T_W$ are set. In F6030, the jumping destination of the subsequent pulse switching processing F6000. (The reason why F6000 is executed in a sequence processing is that shortening the time required for the judgement of the jumping destination allows the minimum pulse width to be reduced.) In the F6030, the jumping destination is set so that the subsequent pulse switching processing F6000 jumps to the next line of F6030 when it is actuated.

Figure 18:
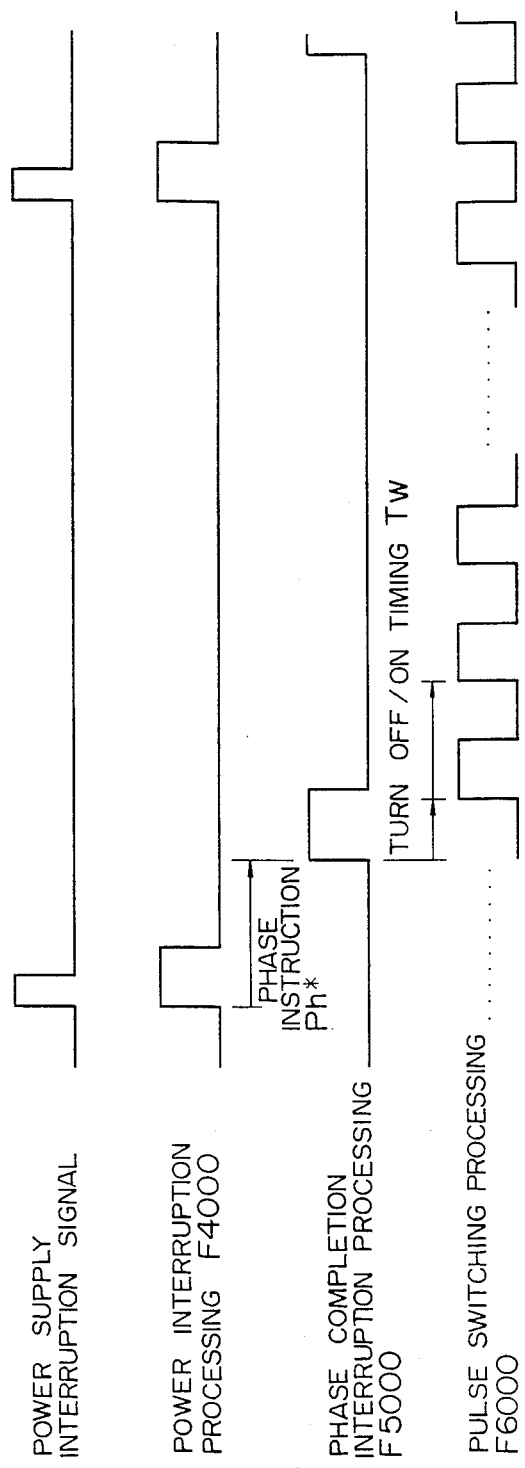
FIG. 18 is a timing chart of one example of an actuation timing.

The time schedule in which the aforesaid processings of F4000, F5000 and F6000 are actuated in FIG. 18. As seen from the figure, the power supply processing F4000 is actuated by a power interruption signal which occurs for each electric angle of 360°; the phase completion interruption processing F5000 which has been scheduled in F4000 is actuated after the time corresponding to the phase data Ph*; and the pulse switching processing F6000 is actuated at the turn-on/off timings $T_W$ which have been scheduled in F5000.

Figure 19:
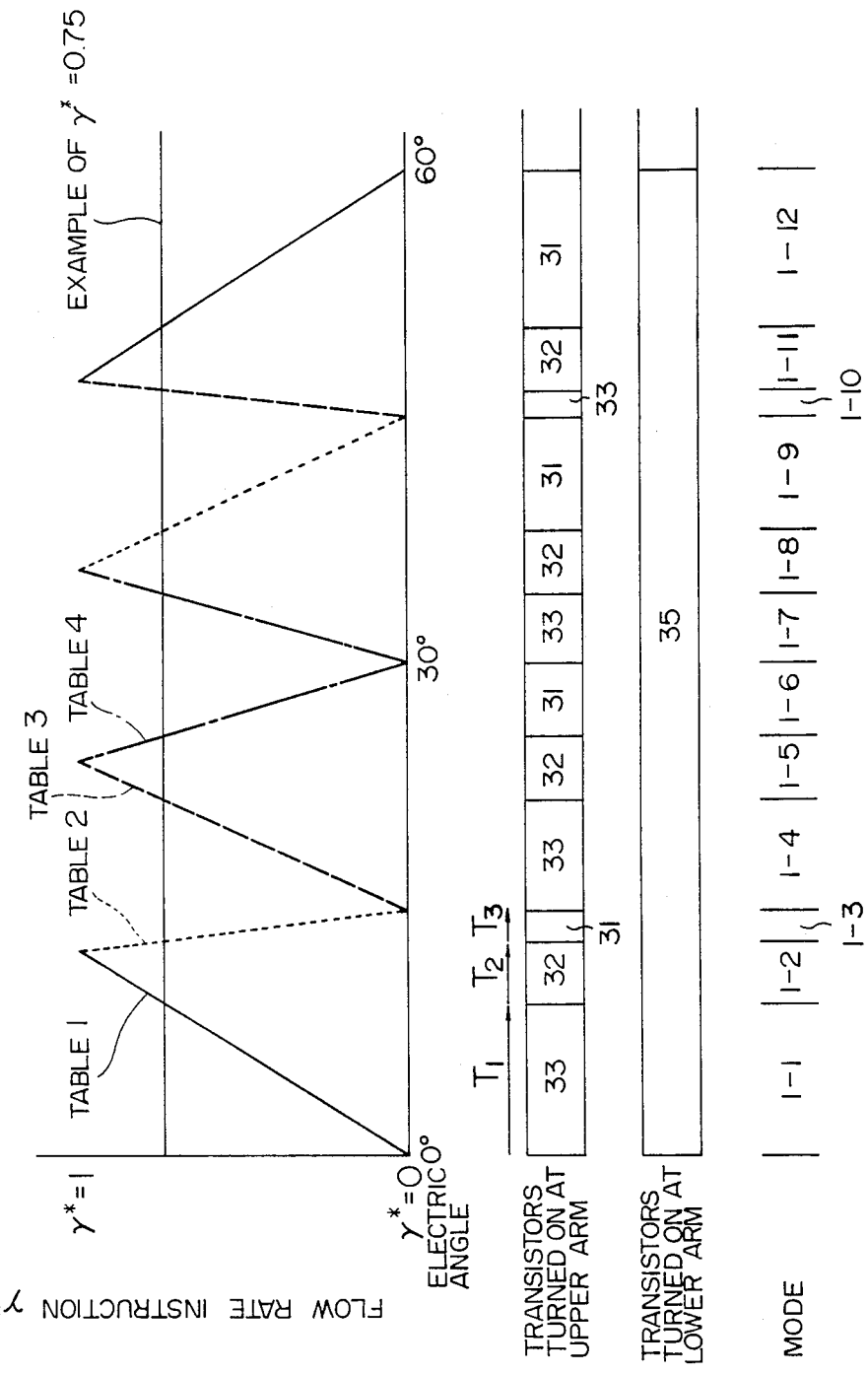
FIG. 19 is a view for explaining the pulse switching processing.

FIG. 19 shows a concrete example of the actuation of the pulse switching processing F6000. In FIG. 19, only the interval of an electric angle of 60° is shown, and the other intervals are omitted since the destination of distributing pulses is only different as in the case of the inverter control.

The conduction rate instruction $\gamma^*$ may be 0.00 to 1.00 and now $\gamma^*=0.75$ is taken as an example. Four kinds of $\gamma^*$ vs. pulse width data table (Tables 1 to 4), which are indicated by a solid line, a dotted line, a broken line and a one-dot chain line, respectively, are folded back at an electric angle of 30°. F5100, F5200 and F5300 included in the phase completion interruption processing F5000 shown in FIG. 16, which are first actuated, correspond to a mode 1-1 in FIG. 19. In this mode, the transistors 33 and 35 are scheduled to be instantaneously turned on. After $T_1$, in a mode 1-2, the transistors 33 and 32 are scheduled to be turned off and turned on, respectively. In the mode 1-1, the turn-off/on time $T_1$ relative to the value of $\gamma^*$ can be decited only by referring to the Table 1, but in the mode 1-2, the turn-off/on time $T_2$ must be decided by referring to both tables of Tables 1 and 2. Further, if the value of $\gamma^*$ is comparatively large as in the present example, an inconvenience occurs in modes 1-3, 1-10, etc. More specifically, in the modes 1-3 and 1-10, in some cases, the pulse switching time (i.e. time elapsed until when the modes 1-3 and 1-10 are shifted to the succeeding modes 1-4 and 1-11, respectively) is so short that a sufficient time cannot be obtained to perform the settings of the schedule of the turn-off/on, of the self-interruption, etc. in the associative memory. Such a phenomenon, if the value of $\gamma^*$ is small, will occur in the modes of 1-1, 1-3, 1-4, 1-6, 1-7, 1-9, 1-10, 1-12, etc.

Figure 20:
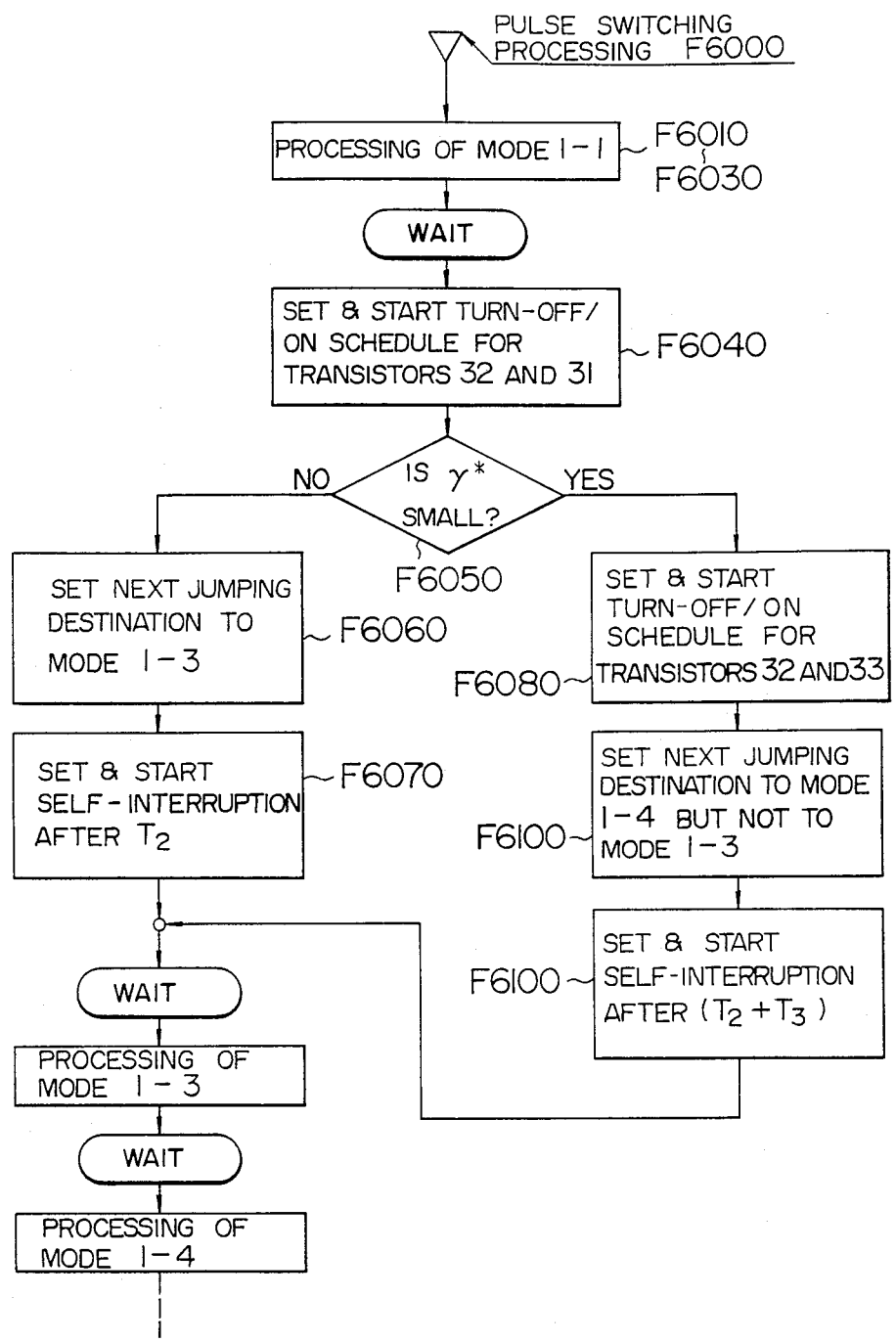
FIG. 20 is a flowchart of another example of the pulse switching processing.

In order to overcome such a phenomenon, this embodiment provides in the pulse switching processing F6000 a processing of setting plural turn-off/on schedules in the associative memory, referring to the value of $\gamma^*$, during the same timer interruption interval. One example thereof is shown in FIG. 20. First, checking is made on if or not the value of $\gamma^*$ is small in F6050. If it is small, a judgment that the time of the succeeding mode, i.e. the mode 1-3 is short is made, and the turn-off/on processing to be performed during the succeeding mode 1-3 is completed within the mode 1-2. Therefore, the mode to be executed subsequently to the mode 1-2 is the mode 1-4 so that the jumping destination is set to the mode 1-4 in F6090. The self-interruption is set not after $T_2$ but after $(T_2+T_3)$ in F6100, and a next interruption is awaited. On the other hand, if the mode 1-3 is executable since the $\gamma^*$ is sufficiently large, the processing is performed in the sequence of F6060 and F6070, and the mode jumping is not made.

The aforesaid processing of setting plural turnoff/on schedules in the same timer interruption interval permits the generation of a pulse having so short a pulse width that cannot be generated in the normal interruption processing, thereby extending the possibility of a harmonics reducing control.

In the above explanation, the aforesaid processing have been adapted to the flow from the mode 1-2 to the modes 1-3 and 1-4 but may be also adapted to the other flows relative to the mode having a narrow width.

Figure 21:
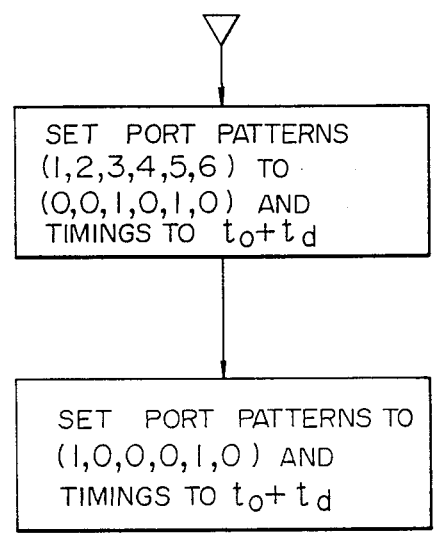
FIG. 21 is a flowchart of another example of the event set processing.

Further, in relation to the execution controller, a system of individually setting an event to each port has been explained. However, the one-chip microcomputer which can simultaneously set the events to all six ports permits the processing of FIG. 9 to be simplified as shown in FIG. 21. In this case, the number of the microcomputer instructions can be reduced from 16 to 4.

This embodiment provides the following meritorious effects.

(1) Since the control system can be directly connected with the I/O port incorporated in one chip or connected with a power converter through a pulse amplifier, its circuit construction is simplified and is highly reliable.

(2) The minimum pulse width is not influenced by an interruption processing time (e.g. 90 $\mu$sec) so that it can be reduced to 2 $\mu$sec or so, thus permitting harmonics to be reduced.

(3) The pulse patterns are entirely created within one-chip microcomputer and thereafter output so that the abnormality of the patterns is equivalent to that of the chip. The abnormality of the chip can be checked through the self-diagnosis function of the microcomputer (e.g. watch dog timer) so that the entire pulse pattern generator is in a supervisor state, thus making the generator highly reliable.

(4) The change of pulse patterns (events) is performed using an internal timer and it can always scheduled by an output control section including an associative memory. Thus, the ALU section has only to set the events and timings in the registers and is released from the output processing, thus implementing a division system which is capable of executing the user's program during the output processing.

(5) The event and timing to be output from the same port can be set many times within the same timer interruption interval so far as the number of storage registers permits. Therefore, the chopping frequency of an inverter or converter can be apparently increased. This permits a power converter for a high frequency and with less ripple to be implement.

Accordingly, in accordance with this invention, the pulse generation in a power converter can be scheduled by a one-chip microcomputer. This permits a low harmonic, high reliability power converter system to be constructed with low cost, and so permits an elevator to be controlled so that it can be operated with sufficiently low noise and low torque ripple.

What is claimed:
1. A method for controlling a power converter in which a control signal is applied to the power converter to operate the power converter, comprising the steps of:
    storing a pair of information including first information for turning on or off at least one element constituting the power converter and second information relating to a time for enabling said first information independently of a prior turn on or turn off of the at least one element; and
    enabling said first information when a time of a timer is coincident with said time of said second information for enabling said first information and applying a control signal for turning on or off said at least one element of said power converter in accordance therewith.

2. A method for controlling a power converter according to claim 1, wherein said storing step stores said pair of information at least one time for each predetermined time interval.

3. A method for controlling a power converter according to claim 2, wherein said storing step stores said paired information of said information for turning on or off and said time for enabling said information a plurality of times for each said predetermined time interval.

4. A method for controlling a power converter according to claim 2, wherein said predetermined time interval is initiated synchronously with a timer interruption.

5. A method for controlling a power converter according to claim 2, wherein said predetermined time interval is a variable time interval.

6. A method for controlling a power converter according to claim 1, wherein said power converter includes a plurality of elements and said storing step stores said pair of information in connection with each of said elements.

7. A method for controlling a power converter according to claim 1, wherein said storing step stores said pair of information so that a width of a pulse representing a period of turn on or turn off of said at least one element is minimized.

8. A method for controlling a power converter in which at least one control signal is applied to the power converter to operate the power converter, comprising the steps of:
calculating first information for turning on or off at least one element constituting the power converter and second information relating to a time for enabling said first information;
storing a pair of information including said first and second information independently of a prior turn on or off of the at least one element; and
enabling said first information when a time of a timer is coincident with said time of said second information for enabling said first information and applying a control signal to said element of said power converter.

9. A method for controlling a power converter according to claim 8, wherein said storing and calculating steps are executed every predetermined time interval, respectively.

10. A method for controlling a power converter according to claim 9, wherein said predetermined time interval in said storing step is initiated by one timer interruption, and said predetermined time interval in said calculation step is initiated by another timer interruption occurring prior to said one timer interruption.

11. A method for controlling a power converter according to claim 8, wherein said storing step stores said pair of information for turning on and so that a width of a pulse representing a period of turn on or turn off of said at least one element is minimized.

12. An apparatus for controlling a power converter in which at least one control signal is applied to the power converter to operate the power converter, comprising:
memory means for storing a pair of information including a first information for turning on or off at least one element constituting the power converter and a second information relating to a time for enabling said first information independently of a prior turn on or turn off of said at least one element;
a timer for outputting a time; and
means for enabling said first information when the time of said timer is coincident with said time of said second information for enabling said first information and for applying a control signal for turning on or turning off said at least one element of said power converter in accordance therewith.

13. An apparatus for controlling a power converter according to claim 12, wherein said memory means is an associative memory.

14. An apparatus for controlling a power converter according to claim 12, wherein said power converter is an A.C.-D.C. converter.

15. An apparatus for controlling a power converter according to claim 14, further comprising means for executing an interruption in synchronism with an A.C. side input power supply.

16. An apparatus for controlling a power converter according to claim 12, wherein said power converter is a D.C.-A.C. converter.

17. An apparatus for controlling a power converter according to claim 16, wherein said D.C.-A.C. converter is a current type converter.

18. An apparatus for controlling a power converter according to claim 17, further comprising means for calculating a total phase by adding an integrated value of a frequency instruction and a phase instruction and calculating, said pair of information in connection with each of said at least one element constituting said power converter in accordance with a peak value of at least two phase voltages of a polyphase A.C.

19. An apparatus for controlling a power converter according to claim 18, further comprising means for dividing electrical angle of 360° into a plurality of modes to enable calculation for each of said modes.

20. An apparatus for controlling a power converter according to claim 12, wherein said memory means stores said pair of information so that a width of a pulse representing a period of turn on or turn off of said at least one element is minimized.

21. An apparatus for controlling a power converter according to claim 12, further comprising means for calculating said pair of information in connection with said at least one element.

22. An apparatus for controlling a power converter according to claim 21, wherein said means for calculating enables calculation of said pair of information in accordance with at least one of a frequency instruction, phase instruction, and a voltage.

23. An apparatus for controlling a power converter according to claim 12, further comprising motor means coupled to an output of said power converter.

24. An apparatus for controlling a power converter according to claim 23, further comprising an elevator coupled to said motor means for being driven thereby.

25. An apparatus for controlling a power converter according to claim 23, wherein said motor means includes an induction motor.

26. An apparatus for controlling a power converter according to claim 25, further comprising an elevator coupled to said induction motor for being driven thereby.

* * * * *